US 6,693,626 B1

(12) United States Patent
Rosenberg

(10) Patent No.: US 6,693,626 B1
(45) Date of Patent: Feb. 17, 2004

(54) HAPTIC FEEDBACK USING A KEYBOARD DEVICE

(75) Inventor: Louis B. Rosenberg, San Jose, CA (US)

(73) Assignee: Immersion Corporation, San Jose, CA (US)

(*) Notice: Subject to any disclaimer, the term of this patent is extended or adjusted under 35 U.S.C. 154(b) by 0 days.

(21) Appl. No.: 09/570,361

(22) Filed: May 12, 2000

Related U.S. Application Data

(63) Continuation-in-part of application No. 09/507,539, filed on Feb. 18, 2000, which is a continuation-in-part of application No. 09/456,887, filed on Dec. 7, 1999, now Pat. No. 6,211,861.
(60) Provisional application No. 60/182,868, filed on Feb. 16, 2000, and provisional application No. 60/172,953, filed on Dec. 21, 1999.

(51) Int. Cl.$^7$ .................................................. G09G 5/00
(52) U.S. Cl. ..................... 345/168; 345/156; 345/702
(58) Field of Search ................................. 345/156, 157, 345/168, 184, 167, 169, 161, 701, 702

(56) References Cited

U.S. PATENT DOCUMENTS

| | | | |
|---|---|---|---|
| 3,157,853 A | 11/1964 | Hirsch | |
| 3,220,121 A | 11/1965 | Cutler | |

(List continued on next page.)

FOREIGN PATENT DOCUMENTS

| | | |
|---|---|---|
| DE | 4400790 | 5/1995 |
| EP | 0085518 A1 | 8/1983 |
| EP | 0 265 011 A1 | 4/1988 |
| EP | 0349086 | 1/1990 |
| EP | 0 607 580 A1 | 7/1994 |
| EP | 0 626 634 A2 | 11/1994 |
| JP | S62-194389 | 12/1987 |
| JP | H2-185278 | 7/1990 |
| JP | H4-8381 | 1/1992 |
| JP | H5-192449 | 8/1993 |
| JP | H5-86387 | 11/1993 |
| JP | H7-24147 | 1/1995 |
| WO | WO 92/00559 | 1/1992 |
| WO | WO 97/31333 | 8/1997 |
| WO | WO 98/32112 | 7/1998 |
| WO | WO 00/03319 | 1/2000 |

OTHER PUBLICATIONS

Baigrie, "Electric Control Loading—A Low Cost, High Performance Alternative," Proceedings, pp. 247–254, Nov. 6–8, 1990.
Iwata, "Pen–based Haptic Virtual Environment," 0–7803–1363–1/93 IEEE, pp 287–292, 1993.

(List continued on next page.)

Primary Examiner—Richard Hjerpe
Assistant Examiner—Ronald Laneau
(74) Attorney, Agent, or Firm—Kilpatrick Stockton LLP.

(57) ABSTRACT

A low-cost haptic feedback keyboard device for providing haptic feedback to a user for enhancing interactions in a displayed environment provided by a computer. The haptic keyboard device can be a keyboard having multiple keys, or can be a wrist rest or other attachment coupled to a keyboard. The device includes a housing that is physically contacted by the user and rests on a support surface. An actuator is coupled to the housing and applies a force to the housing approximately along an axis that is substantially perpendicular to the support surface, where the force is transmitted to the user contacting the housing. In one embodiment, the force is an inertial force that is output by moving an inertial mass. The keyboard device can be used in conjunction with another haptic device, such as a mouse, trackball, or joystick.

16 Claims, 6 Drawing Sheets

U.S. PATENT DOCUMENTS

| | | | |
|---|---|---|---|
| 3,497,668 A | 2/1970 | Hirsch | |
| 3,517,446 A | 6/1970 | Corlyon et al. | |
| 3,902,687 A | 9/1975 | Hightower | |
| 3,903,614 A | 9/1975 | Diamond et al. | |
| 3,919,691 A | 11/1975 | Noll | 340/172.5 |
| 4,160,508 A | 7/1979 | Salsbury | |
| 4,236,325 A | 12/1980 | Hall et al. | |
| 4,414,984 A | 11/1983 | Zarudiansky | 128/774 |
| 4,467,150 A * | 8/1984 | Leitermann et al. | 200/5 A |
| 4,513,235 A | 4/1985 | Acklam et al. | |
| 4,560,983 A | 12/1985 | Williams | 340/825 |
| 4,581,491 A | 4/1986 | Boothroyd | |
| 4,599,070 A | 7/1986 | Hladky et al. | |
| 4,692,756 A | 9/1987 | Clark | 340/709 |
| 4,706,294 A | 11/1987 | Ouchida | 381/109 |
| 4,708,656 A | 11/1987 | De Vries et al. | |
| 4,712,092 A * | 12/1987 | Boldridge et al. | 341/34 |
| 4,713,007 A | 12/1987 | Alban | |
| 4,731,603 A | 3/1988 | McRae et al. | 340/407 |
| 4,787,051 A | 11/1988 | Olson | 364/518 |
| 4,791,416 A | 12/1988 | Adler | 340/712 |
| 4,795,296 A | 1/1989 | Jau | 414/5 |
| 4,868,549 A | 9/1989 | Affinito et al. | 340/710 |
| 4,885,565 A | 12/1989 | Embach | 340/407 |
| 4,891,764 A | 1/1990 | McIntosh | |
| 4,896,554 A | 1/1990 | Culver | 74/471 XY |
| 4,930,770 A | 6/1990 | Baker | |
| 4,934,694 A | 6/1990 | McIntosh | |
| 4,935,728 A | 6/1990 | Kley | 340/709 |
| 4,949,119 A | 8/1990 | Moncrief et al. | 364/578 |
| 4,983,901 A | 1/1991 | Lehmer | 318/685 |
| 5,019,761 A | 5/1991 | Kraft | |
| 5,022,407 A | 6/1991 | Horch et al. | |
| 5,035,242 A | 7/1991 | Franklin | |
| 5,038,089 A | 8/1991 | Szakaly | |
| 5,044,956 A | 9/1991 | Behensky et al. | 434/45 |
| 5,078,152 A | 1/1992 | Bond | |
| 5,107,262 A | 4/1992 | Cadoz et al. | 341/22 |
| 5,146,566 A | 9/1992 | Hollis, Jr. et al. | 395/275 |
| 5,184,319 A | 2/1993 | Kramer | 364/806 |
| 5,186,629 A | 2/1993 | Rohen | 434/114 |
| 5,186,695 A | 2/1993 | Mangseth et al. | |
| 5,203,563 A | 4/1993 | Loper, III | 273/148 B |
| 5,212,473 A | 5/1993 | Louis | |
| 5,240,417 A | 8/1993 | Smithson et al. | |
| 5,271,290 A | 12/1993 | Fischer | |
| 5,275,174 A | 1/1994 | Cook | |
| 5,296,871 A | 3/1994 | Paley | 345/163 |
| 5,299,810 A | 4/1994 | Pierce | |
| 5,309,140 A | 5/1994 | Everett | |
| 5,334,027 A | 8/1994 | Wherlock | |
| 5,351,412 A | 10/1994 | Furuhata et al. | 33/568 |
| 5,355,148 A | 10/1994 | Anderson | 345/166 |
| 5,388,992 A | 2/1995 | Franklin et al. | 434/114 |
| 5,399,091 A | 3/1995 | Mitsumoto | 434/61 |
| 5,405,152 A | 4/1995 | Katanics et al. | 273/438 |
| 5,451,924 A | 9/1995 | Massimino et al. | 340/407.1 |
| 5,466,213 A | 11/1995 | Hogan | |
| 5,489,812 A | 2/1996 | Furuhata et al. | 310/309 |
| 5,547,382 A | 8/1996 | Yamasaki | |
| 5,550,562 A | 8/1996 | Aoki et al. | 345/163 |
| 5,565,840 A | 10/1996 | Thorner et al. | 340/407.1 |
| 5,580,251 A | 12/1996 | Gilkes et al. | 434/113 |
| 5,583,478 A | 12/1996 | Renzi | 340/407.1 |
| 5,589,828 A | 12/1996 | Armstrong | 341/20 |
| 5,611,731 A | 3/1997 | Bouton et al. | 463/37 |
| 5,625,576 A | 4/1997 | Massie et al. | 364/578 |
| 5,629,594 A | 5/1997 | Jacobus et al. | 318/568.11 |
| 5,642,469 A | 6/1997 | Hannaford et al. | 395/99 |
| 5,643,087 A | 7/1997 | Marcus et al. | 463/38 |
| 5,666,138 A | 9/1997 | Culver | 345/161 |
| 5,669,818 A | 9/1997 | Thorner et al. | 463/30 |
| 5,684,722 A | 11/1997 | Thorner et al. | 364/578 |
| 5,691,898 A | 11/1997 | Rosenberg et al. | 364/190 |
| 5,709,219 A | 1/1998 | Chen et al. | 128/782 |
| 5,714,978 A | 2/1998 | Yamanaka et al. | 345/157 |
| 5,734,373 A | 3/1998 | Rosenberg et al. | 345/161 |
| 5,736,978 A | 4/1998 | Hasser et al. | 345/173 |
| 5,742,278 A | 4/1998 | Chen et al. | 345/156 |
| 5,754,023 A | 5/1998 | Roston et al. | 318/561 |
| 5,766,016 A | 6/1998 | Sinclair | |
| 5,781,172 A | 7/1998 | Engel et al. | 345/164 |
| 5,784,052 A | 7/1998 | Keyson | 345/167 |
| 5,785,630 A | 7/1998 | Bobick et al. | |
| 5,790,108 A | 8/1998 | Salcudean et al. | 345/184 |
| 5,821,921 A | 10/1998 | Osborn et al. | 345/157 |
| 5,825,308 A | 10/1998 | Rosenberg | 341/20 |
| 5,841,423 A | 11/1998 | Carroll, Jr. et al. | 345/168 |
| 5,857,986 A | 1/1999 | Moriyasu | 601/49 |
| 5,880,714 A | 3/1999 | Rosenberg et al. | 345/156 |
| 5,889,672 A | 3/1999 | Schuler et al. | 364/188 |
| 5,894,263 A | 4/1999 | Shimakawa et al. | 340/388.1 |
| 5,897,437 A | 4/1999 | Nishiumi et al. | 463/47 |
| 5,914,705 A | 6/1999 | Johnson et al. | 345/163 |
| 5,943,044 A | 8/1999 | Martinelli et al. | 345/174 |
| 5,944,151 A | 8/1999 | Jakobs et al. | 188/267.1 |
| 5,945,772 A | 8/1999 | Macnak et al. | 310/326 |
| 5,956,016 A | 9/1999 | Kuenzner et al. | 345/156 |
| 5,959,613 A | 9/1999 | Rosenberg et al. | 345/161 |
| 5,973,670 A | 10/1999 | Barber et al. | 345/157 |
| 5,973,689 A | 10/1999 | Gallery | 345/339 |
| 5,984,880 A | 11/1999 | Lander et al. | 600/595 |
| 5,986,643 A | 11/1999 | Harvill et al. | 345/156 |
| 5,988,902 A | 11/1999 | Holehan | 400/479.1 |
| 6,001,014 A | 12/1999 | Ogata et al. | 463/37 |
| 6,004,134 A | 12/1999 | Marcus et al. | 434/45 |
| 6,020,876 A | 2/2000 | Rosenberg et al. | 345/157 |
| 6,028,593 A | 2/2000 | Rosenberg et al. | 345/156 |
| 6,044,646 A | 4/2000 | Silverbrook | 60/528 |
| 6,078,126 A | 6/2000 | Rollins et al. | 310/330 |
| 6,078,308 A | 6/2000 | Rosenberg et al. | 345/145 |
| 6,088,017 A | 7/2000 | Tremblay et al. | 345/156 |
| 6,088,019 A | 7/2000 | Rosenberg | 345/156 |
| 6,111,577 A | 8/2000 | Zilles et al. | |
| 6,128,006 A | 10/2000 | Rosenberg et al. | 345/163 |
| 6,154,201 A | 11/2000 | Levin et al. | 345/184 |
| 6,184,868 B1 | 2/2001 | Shahoian et al. | 345/161 |
| 6,198,206 B1 | 3/2001 | Saarmaa et al. | 310/340 |
| 6,211,861 B1 | 4/2001 | Rosenberg et al. | 345/163 |
| 6,219,034 B1 | 4/2001 | Elbing et al. | |
| 6,243,078 B1 | 6/2001 | Rosenberg | 345/161 |
| 6,300,938 B1 | 10/2001 | Culver | 345/156 |
| 6,337,678 B1 * | 1/2002 | Fish | 345/156 |
| 6,422,941 B1 | 7/2002 | Thorner et al. | |
| 2002/0044132 A1 * | 4/2002 | Fish | 345/156 |

OTHER PUBLICATIONS

Russo, "The Design and Implementation of a Three Degree of Freedom Force Output Joystick," MIT Libraries Archives Aug. 14, 1990, pp. 1–131, May 1990.

Brooks et al., "Hand Controllers for Teleoperation—A State–of–the–Art Technology Survey and Evaluation," JPL Publication 85–11; NASA–CR–175890; N85–28559, pp. 1–84, Mar. 1, 1985.

Jones et al., "A perceptual analysis of stiffness," ISSN 0014–4819 Springer International (Springer–Vertag); Experimental Brain Research, vol. 79, No. 1, pp. 150–156, 1990.

Burdea et al., "Distributed Virtual Force Feedback, Lecture Notes for Workshop on Force Display in Virtual Environments and its Application to Robotic Teleoperation," 1993 IEEE International Conference on Robotics and Automation, pp. 25–44, May 2, 1993.

Snow et al., "Model–X Force–Reflecting–Hand–Controller," NT Control No. MPO–17851; JPL Case No. 5348, pp. 1–4, Jun. 15, 1989.

Ouh–Young, "Force Display in Molecular Docking," Order No. 9034744, p. 1–369, 1990.

Tadros, Control System Design for a Three Degree of Freedom Virtual Environment Simulator Using Motor/Brake Pair Actuators, MIT Archive© Massachusetts Institute of Technology, pp. 1–88, Feb. 1990.

Caldwell et al., "Enhanced Tactile Feedback (Tele–Traction) Using a Multi–Functional Sensory System," 1050–4729/93, pp. 955–960, 1993.

Adelstein, "Design and Implementation of a Force Reflecting Manipulandum for Manual Control research," DSC–vol. 42, Advances in Robotics, Edited by H. Kazerooni, pp. 1–12, 1992.

Gotow et al., "Controlled Impedance Test Apparatus for Studying Human Interpretation of Kinesthetic Feedback," WA11–11:00, pp. 332–337.

Stanley et al., "Computer Simulation of Interacting Dynamic Mechanical Systems Using Distributed Memory Parallel Processors," DSV–vol. 42, Advances in Robotics, pp. 55–61, ASME 1992.

Russo, "Controlling Dissipative Magnetic Particle Brakes in Force Reflective Devices," DSC–vol. 42, Advances in Robotics, pp. 63–70, ASME 1992.

Kontarinis et al., "Display of High–Frequency Tactile Information to Teleoperators," Telemanipulator Technology and Space Telerobotics, Won S. Kim, Editor, Proc. SPIE vol. 2057, pp. 40–50, Sep. 7–9, 1993.

Patrick et al., "Design and Testing of A Non–reactive, Fingertip, Tactile Display for Interaction with Remote Environments," Cooperative Intelligent Robotics in Space, Rui J. deFigueiredo et al., Editor, Proc. SPIE vol. 1387, pp. 215–222, 1990.

Adelstein, "A Virtual Environment System For The Study of Human Arm Tremor," Ph.D. Dissertation, Dept. of Mechanical Engineering, MIT, Jun. 1989.

Bejczy, "Sensors, Controls, and Man–Machine Interface for Advanced Teleoperation," Science, vol. 208, No. 4450, pp. 1327–1335, 1980.

Bejczy, "Generalization of Bilateral Force–Reflecting Control of Manipulators," Proceedings Of Fourth CISM–IFToMM, Sep. 8–12, 1981.

McAffee, "Teleoperator Subsystem/Telerobot Demonsdtrator: Force Reflecting Hand Controller Equipment Manual," JPL D–5172, pp. 1–50, A1–A36, B1–B5, C1–C36, Jan. 1988.

Minsky, "Computational Haptics: The Sandpaper System for Synthesizing Textue for a Force–Feedback Display," Ph.D. Dissertation, MIT, Jun. 1995.

Jacobsen et al., "High Performance, Dextrous Telerobotic Manipulator With Force Reflection," Intervention/ROV '91 Conference & Exposition, Hollywood, Florida, May 21–23, 1991.

Shimoga, "Finger Force and Touch Feedback Issues in Dexterous Telemanipulation," Proceedings of Fourth Annual Conference on Intelligent Robotic Systems for Space Exploration, Rensselaer Polytechnic Institute, Sep. 30–Oct. 1, 1992.

IBM Technical Disclosure Bullein, "Mouse Ball–Actuating Device With Force and Tactile Feedback," vol. 32, No. 9B, Feb. 1990.

Terry et al., "Tactile Feedback In A Computer Mouse," Proceedings of Fourteenth Annual Northeast Bioengineering Conference, University of New Hampshire, Mar. 10–11, 1988.

Howe, "A Force–Reflecting Teleoperated Hand System for the Study of Tactile Sensing in Precision Manipulation," Proceedings of the 1992 IEEE International Conference on Robotics and Automation, Nice, France, May 1992.

Eberhardt et al., "OMAR—A Haptic display for speech perception by deaf and def–blind individuals," IEEE Virtual Reality Annual International Symposium, Seattle, WA, Sep. 18–22, 1993.

Rabinowitz et al., "Multidimensional tactile displays: Identification of vibratory intensity, frequency, and contractor area," Journal of The Accoustical Society of America, vol. 82, No. 4, Oct. 1987.

Bejczy, "Kinesthetic Coupling Between Operator and Remote Manipulator," International Computer Technology Conference, The American Society of Mechanical Engineers, San Francisco, CA, Aug. 12–15, 1980.

Bejczy et al., "A Laboratory Breadboard System For Dual–Arm Teleoperation," SOAR '89 Workshop, JSC, Houston, TX, Jul. 25–27, 1989.

Ouh–Young, "A Low–Cost Force Feedback Joystick and Its Use in PC Video Games," IEEE Transactions on Consumer Electronics, vol. 41, No. 3, Aug. 1995.

Marcus, "Touch Feedback in Surgery," Proceedings of Virtual Reality and Medicine The Cutting Edge, Sep. 8–11, 1994.

Bejczy, et al., "Universal Computer Control System (UCCS) For Space Telerobots," CH2413–3/87/0000/0318501.00 1987 IEEE, 1987.

Aukstakalnis et al., "Silicon Mirage: The Art and Science of Virtual Reality," ISBN 0–938151–82–7, pp. 129–180, 1992.

Eberhardt et al., "Including Dynamic Haptic Perception by The Hand: System Description and Some Results," DSC–vol. 55–1, Dynamic Systems and Control: vol. 1, ASME 1994.

Gobel et al., "Tactile Feedback Applied to Computer Mice," International Journal of Human–Computer Interaction, vol. 7, No. 1, pp. 1–24, 1995.

Pimentel et al., "Virtual Reality: through the new looking glass," $2^{nd}$ Edition; McGraw–Hill, ISBN 0–07–050167–X, pp. 41–202, 1994.

"Cyberman Technical Specification," Logitech Cyberman SWIFT Supplement, Apr. 5, 1994.

Ouhyoung et al., "The Development of A Low–Cost Force Feedback Joystick and Its Use in the Virtual Reality Environment," Proceedings of the Third Pacific Conference on Computer Graphics and Applications, Pacific Graphics '95, Seoul, Korea, Aug. 21–24, 1995.

Kaczmarek et al., "Tactile Displays," Virtual Environment Technologies.

"Taking a Joystick Ride", Computer Currents, Tim Scannell, Nov. 1994, Boston Edition, vol. 9 No. 11.

"Coaxial Control Shaker Part No. C-25502," Safe Flight Instrument Corporation, 26 pages, Jul. 1, 1967; Revised Jan. 28, 2002.

Wiker, Steven F. et al., "Development of Tactile Mice for Blind Access to Computers: Importance of Stimulation Locus, Object Size, and Vibrotactile Display Resolution," Proceedings of the Human Factors Society 35th Annual Meeting 1991, pp. 708–712.

Schmult, Brian et al., "Application Areas for a Force–Feedback Joystick," ASME 1993, DSC–vol. 49, pp. 47–54.

Su, S. Augustine, "The Virtual Panel Architecture: A 3D Gesture Framework," IEEE Jan. 1993.

Adachi, Yoshitaka et al., "Sensory Evaluation of Virtual Haptic Push–Buttons," Technical Research Center, Suzuki Motor Corporation, Nov. 1994.

Rosenberg et al., "Commercially Viable Force Feedback Controller for Individuals with Neuromotor Disabilities," USAF Armstrong Lab. AL/CF–TR–1997–0016,1996, pp. 1–33.

Kelley, A.J. et al., "MagicMouse: Tactile and Kinesthetic Feedback in the Human–Computer Interface using an Electromagnetically Actuated Input/Output Device," Dept. of Elec. Engineering, Univ. of British Columbia, 1993, pp. 1–27.

Ramstein, C., "Combining Haptic and Braille Technologies: Design Issues and Pilot Study," ASSETS '96, $2^{nd}$ Annual ACM Conf. on Assistive Technologies, 1996, pp. 37–44.

Akamatsu, M., et al., "Multimodal Mouse: A Mouse–Type Device with Tactile and Force Display", Presence, vol. 3, No. 1, Winter 1994, pp. 73–80.

Hasser, C., "Tactile Feedback for a Force–Reflecting Haptic Display", Univ. of Dayton, Dayton OH, 1995, pp. 1–96.

Hasser, C., "Tactile Feedback with Adaptive Controller for a Force–Reflecting Haptic Display," Parts 1&2, IEEE 0–7803–3131–1, 1996, pp. 526–533.

Dennerlein, et al., "Vibrotactile Feedback for Industrial Telemanipulators," ASME IMECE, $6^{th}$ Annual Symp. On Haptic Interfaces for Virtual Environment and Teleoperator Systems, Nov. 1997, pp. 1–7.

Minsky, et al., "Feeling and Seeing: Issues in Force Display", Department of Computer Science, University of North Carolina at Chapel Hill, Chapel Hill, NC 27599, 1990 ACM.

* cited by examiner

HAPTIC FEEDBACK USING A KEYBOARD DEVICE

CROSS REFERENCE TO RELATED APPLICATIONS

This application is a continuation-in-part of co-pending parent patent applications:

Application Ser. No. 09/456,887, filed Dec. 7, 1999 now U.S. Pat. No. 6,211,861 on behalf of Louis Rosenberg, entitled, "Tactile Mouse Device,"

Application Ser. No. 09/507,539, filed Feb. 18, 2000 on behalf of Bruneau et al., entitled, "Haptic Trackball Device,"

and the present application claims priority to Provisional Patent Application No. 60/172,953, filed Dec. 21, 1999, and No. 60/182,868, filed Feb. 16, 2000, all of which are incorporated by reference herein in their entirety.

BACKGROUND OF THE INVENTION

The present invention relates generally to interface devices for allowing humans to interface with computer systems, and more particularly to computer interface devices that allow the user to provide input to computer systems and allow computer systems to provide haptic feedback to the user.

A user can interact with an environment displayed by a computer to perform functions and tasks on the computer, such entering data, experiencing a simulation or virtual reality environment, using a computer aided design system, operating a graphical user interface (GUI), etc. A common human-computer interface devices used for inputting information to a computer is a keyboard device, such as a standard 104-key keyboard, laptop keyboard, numeric keypad, or the like. Inputting information via a keyboard remains an efficient and often-used way of interfacing with computer systems.

Other interface devices are also used to input information to a computer system. For example, many users use a mouse, trackball, or stylus to move a cursor in a graphical environment to select various functions in the graphical environment. In other applications such as games, a joystick, steering wheel, sphere, gamepad, etc., can be used to provide input to the computer system. In some of these interface devices, force feedback or tactile feedback is also provided to the user, more generally known herein as "haptic feedback." These types of interface devices can provide physical sensations which are felt by the user manipulating a user manipulandum of the interface device. Typically, one or more motors or other actuators are coupled to the device and are controlled by a processor or the controlling computer system. The computer system controls forces, such as vibrations, pulses, spring forces, etc., on the device in conjunction and coordinated with computer-displayed events and interactions by sending control signals or commands to the actuators.

Many users use both a keyboard and another device, such as a mouse, when providing input to a computer system. For example, a user may use a mouse to control a cursor in a word processor to select words or sentences or paste text in a particular location. The user uses the keyboard to input the letters and other characters in the document. This presents a problem when providing tactile feedback only via a mouse or similar interface device, which is typically the case. The user must contact the mouse or other device to feel the haptic feedback, yet the user must remove his or her hand from the device when entering information with the keyboard. Thus, there are numerous times when the user is not experiencing haptic feedback due to use of the keyboard.

SUMMARY OF THE INVENTION

The present invention is directed to a haptic feedback keyboard device that allows the user to experience haptic feedback when using the keyboard. This allows the user to provide input to a computer system and experience haptic feedback when typing and otherwise inputting information using a keyboard.

More specifically, one embodiment of the present invention provides a haptic feedback keyboard device that is coupled to a host computer which implements a host application program. The haptic feedback device provides haptic feedback to a user inputting information to the host computer by pressing keys on a keyboard device, and includes a housing that is physically contacted by the user. One preferred embodiment is a wrist rest that is positioned next to the keyboard. The housing rests on a support surface, where the user rests at least a portion of at least one hand on the housing while pressing keys of the keyboard device or during periods of time between pressing keys. An actuator is coupled to the housing of the device which applies a force to the housing approximately along an axis that is substantially perpendicular to the support surface, wherein the force is transmitted to the user contacting the housing.

The force can be an inertial force that is output approximately along the axis perpendicular to the support surface, where the actuator outputs the inertial force to the housing by moving an inertial mass. In some embodiments, the inertial mass can include the actuator, where a flexure couples the actuator to the housing and allows the actuator to be moved as the inertial mass. The inertial force is correlated with an interaction of at least two graphical objects displayed by said host computer on a display device. The inertial force is a pulse correlated with the interaction of a user-controlled cursor with a graphical object displayed in a graphical user interface. The user-controlled cursor is controlled by an interface device separate from the keyboard device and the haptic feedback device. The force can also be a contact force that is provided by using the actuator to drive a moving element that contacts the user.

Preferably, at least one compliant element, made of a material such as rubber or foam, is coupled to the housing and supports the housing on the support surface. The compliance of the element allows the force to be greater in magnitude than if the housing contacted the support surface directly. A microprocessor, separate from said host computer, can receive host commands from the host computer and output force signals to the actuator for controlling the force.

In another embodiment of the present invention, the haptic feedback keyboard device includes a housing that is physically contacted by the user and rests on a support surface. A number of keys are provided which are receptive to a physical contact by the user. A sensor device detects when at least one of the keys is pressed by the user, where the sensor device is capable of providing an input signal when a key is pressed. An actuator is coupled to the housing and applies a force to the housing, where the force is transmitted to the user contacting the housing. At least one compliant element is preferably coupled between a portion of the housing contacted by the user and the support surface, the compliant element amplifying the force output from the actuator by allowing the contacted portion of the housing to move with respect to the support surface. For example, the compliant element can be a compliant foot or layer provided between the housing and the support surface. The force can be output approximately along an axis that is perpendicular to the support surface. The force is correlated with an interaction of graphical objects displayed in a graphical environment implemented by the host computer. A method similarly includes detecting the pressing of at least one key of a keyboard device coupled to the host computer, and providing information from the host computer to an actuator to control a haptic sensation which is correlated with a computer-implemented interaction or event. A force is output on a housing contacted by the user using the actuator approximately along an axis perpendicular to a surface supporting the housing.

The present invention advantageously provides a haptic feedback keyboard device that is significantly lower in cost than other types of haptic feedback devices and is thus well-suited for home consumer applications. One or more low-cost actuators can be provided that apply a force in a particular degree of freedom, such as the Z-axis perpendicular to the support surface, and compliance is provided between the surface and the housing to allow forces of greater magnitude. The actuator of the present invention can provide a variety of different types of force sensations to enhance the user's interfacing and experience with a computer application.

These and other advantages of the present invention will become apparent to those skilled in the art upon a reading of the following specification of the invention and a study of the several figures of the drawing.

DETAILED DESCRIPTION OF PREFERRED EMBODIMENTS

Figure 1:
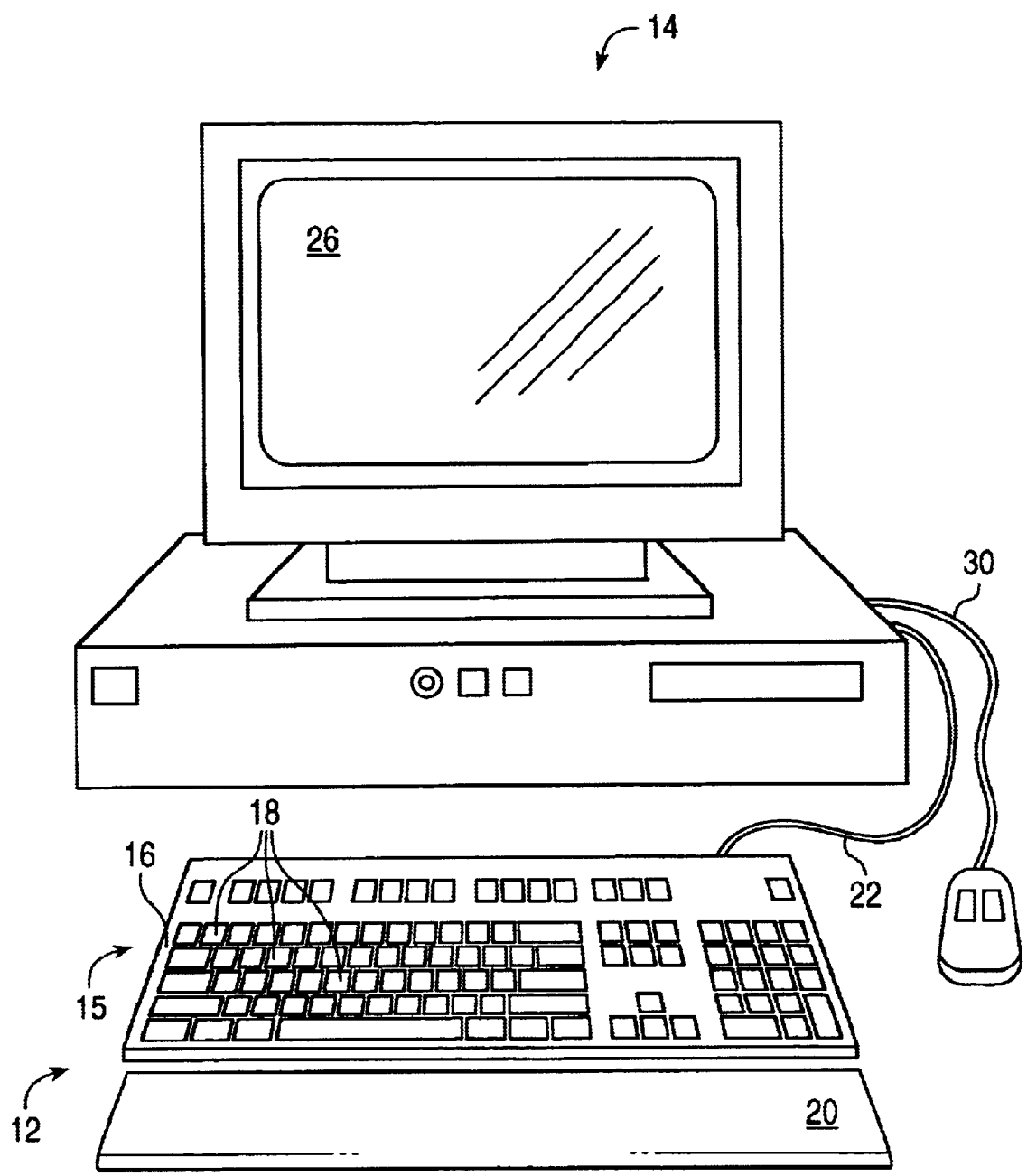
FIG. 1 is a perspective view of system including a haptic keyboard device of the present invention connected to a host computer.

FIG. 1 is a perspective view of a haptic feedback interface system 10 of the present invention capable of providing input to a host computer based on the user's manipulation of a keyboard and capable of providing haptic feedback to the user of the interface system based on events occurring in a program implemented by the host computer. System 10 includes a keyboard device 12 and a host computer 14.

Keyboard device 12 includes a keyboard 15 and a wrist rest 20. Keyboard 15 includes a housing 16 and a number of keys 18. The user provides input to the computer system 14 by pressing the keys 18 of the keyboard as is well known. Herein, "pressing" a key can mean any action including physically contacting a predefined key or area to provide an input signal to a host computer or other controller, and can include physically moving a key from a rest position to a depressed position, contacting a predefined area that senses user contact, etc. The keyboard 15 can be a full-sized keyboard with over 100 keys, as shown, or a smaller version, such as a numeric keypad (shown in FIGS. 4a and 4b), portable keyboard, etc.

The keyboard 15 can provide input to an application program in a graphical user interface/operating system, such as a word processor, spreadsheet program, database program, mail program, web browser, etc. The application program can also be a game program, simulation program, etc., where the key input allows the user to control a graphical object or entity. For example, a word processing program can output force sensation commands to the keyboard device 12 to provide pulses or jolts that coincide with page breaks scrolling by, borders of windows or other displayed areas crossed by the cursor, etc. In a game program, a force command or signal can be sent to the device 12 when a bullet, wall, or other object impacts the user's character or vehicle, when a shot is fired by the user, etc.

In the embodiment shown, the user preferably rests his or her wrist and/or palm on the wrist rest 20 while typing on the keyboard 12. Wrist rest 20 includes haptic feedback generator that is responsive to signals from the host computer 14 and/or a local microprocessor. This allows the user to experience haptic feedback provided by actuator(s) in the wrist rest 20, as described in greater detail below with respect to FIG. 2.

Keyboard device 12 is coupled to the computer 14 by a bus 22, which communicates signals between device 12 and computer 14 and also provides power to the keyboard device 12. Components of the present invention such as an actuator (described below) require power that in some embodiments can be supplied through the bus 22, e.g. if the bus is, for example, a USB or Firewire bus. In some embodiments, the power for the actuator can be supplemented or solely supplied by a power storage device provided on the device 12 (such as in wrist rest 20), such as a capacitor or one or more batteries. Some embodiments of such a device are disclosed in U.S. Pat. No. 5,691,898, incorporated herein by reference. In other embodiments, signals can be sent between keyboard device 12 and computer 14 by wireless transmission/reception of electromagnetic energy (infrared, radio frequency (RF), etc.) or other types of signals.

Host computer 14 is preferably a personal computer or workstation, such as a PC compatible computer or Macintosh personal computer, or a Sun or Silicon Graphics workstation. For example, the computer 14 can operate under the Windows™, MacOS, Unix, or MS-DOS operating system. Alternatively, host computer system 14 can be one of a variety of home video game console systems commonly connected to a television set or other display, such as systems available from Nintendo, Sega, or Sony. In other embodiments, host computer system 14 can be a "set top box" which can be used, for example, to provide interactive television functions to users, a "network-" or "internet-computer" which allows users to interact with a local or global network using standard connections and protocols such as used for the Internet and World Wide Web, or other electronic appliance or device allowing the user to provide input for selection or control. Host computer 14 preferably includes a host microprocessor, random access memory (RAM), read only memory (ROM), input/output (I/O) circuitry, and other components of computers well-known to those skilled in the art.

Host computer 14 preferably implements one or more host application programs with which a user is interacting via keyboard device 12 and other peripherals, if appropriate, and which may include force feedback functionality. For example, a host application program can be a video game, word processor or spreadsheet, email program, Web page or browser that implements HTML or VRML instructions, scientific analysis program, virtual reality training program or application, or other application program that utilizes input of keyboard device 12 and outputs force feedback commands to the device 12. In one embodiment, an application program utilizes a graphical user interface (GUI) of an operating system to present options to a user and receive input from the user. Herein, computer 14 may be referred as providing a "computer environment," which can be a graphical user interface, game, simulation, text interface, command line, or other environment. The computer displays "graphical objects" or "computer objects," which are not physical objects, but are logical software unit collections of data and/or procedures that may be displayed as images by computer 14 on a display screen, as is well known to those skilled in the art. A displayed cursor or a simulated cockpit of an aircraft might be considered a graphical object. The host application program checks for input signals received from the keyboard device 12, and outputs force values and/or commands to be converted into forces output for keyboard device 12. Suitable software drivers which interface such simulation software with computer input/output (I/O) devices are available from Immersion Corporation of San Jose, Calif.

Display device 26 can be included in host computer 14 and can be a standard display screen (LCD, CRT, flat panel, etc.), 3-D goggles, or any other visual output device. Typically, the host application provides images to be displayed on display device 26 and/or other feedback, such as auditory signals. For example, display screen 26 can display images from a GUI or text window.

Other peripheral devices such as mouse 30 can also be connected to the host computer 14. Mouse 30 can be manipulated by the user in two planar dimensions to control a cursor or other control in a displayed computer environment or provide other input. In one common arrangement, the user manipulates both mouse 30 and keyboard device 12 to provide input to a word processor, spreadsheet, or similar program running on host computer 14. In some embodiments, the mouse 30 can be a haptic feedback mouse that provides tactile sensations and/or kinesthetic forces to the user. For example, the mouse 30 can be mouse device as described in any of copending U.S. patent application Ser. Nos. 08/881,691, 08/965,720, 09/049,155, 09/103,281, 09/253,132, 09/456,887, and 09/125,711, all incorporated herein by reference. Other peripheral devices may also be used, such as a trackball, joystick, touchpad, stylus, etc., in normal or haptic versions.

Figure 2:
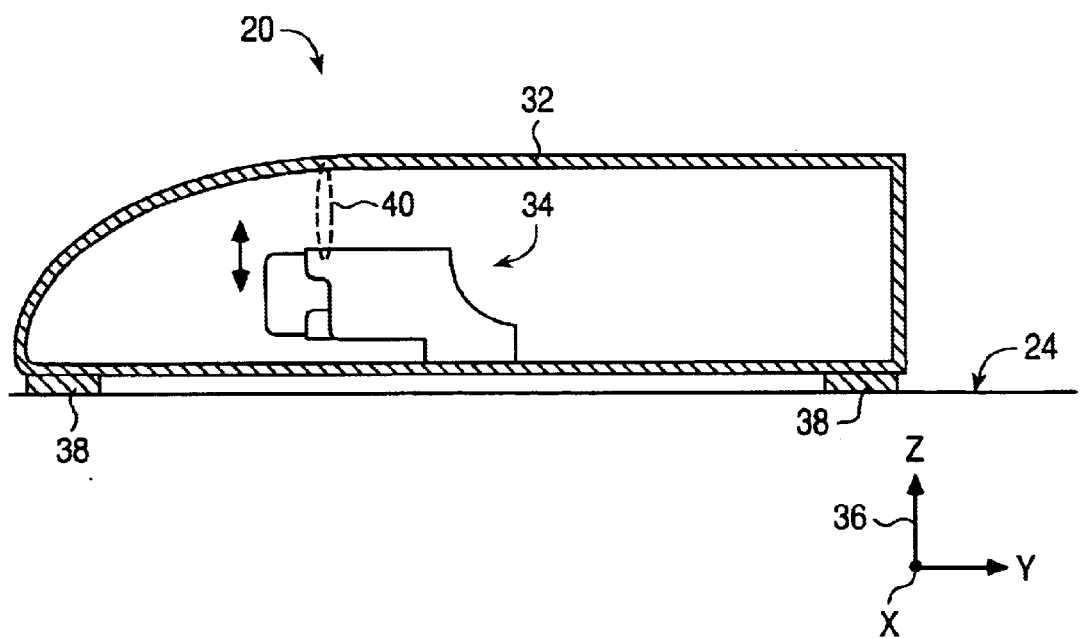
FIG. 2 is a side cross sectional view of a wrist rest device of the keyboard device of FIG. 1 providing haptic feedback.

FIG. 2 is a side cross-sectional view of the wrist rest 20 of the keyboard device 12 of FIG. 1. Wrist rest 20 includes one or more actuators for imparting haptic feedback such as tactile sensations to the user of the wrist rest 20. The actuator outputs forces on the wrist rest 20 which the user is able to feel.

Wrist rest 20 includes a housing 32 and an actuator assembly 34. Housing 32 can be provided in a variety of shapes to provide the user with a comfortable surface to rest his or her wrists and/or palms during or between typing activity. In some embodiments, the housing 32 can include a soft or spongy top surface to provide additional comfort for the user, so long as forces are adequately transmitted through the top surface. The wrist rest 20 can be coupled to a keyboard housing 16 as shown in FIG. 1, molded with the keyboard housing as a single unit, or can be a separate piece that is positioned next to the keyboard housing.

Actuator assembly 34 is coupled to the housing 32 to provide haptic feedback to the user. In the described embodiment, inertial forces are provided by moving an inertial mass, which causes forces on the housing 32 felt by the user who is contacting the housing. A preferred embodiment creates inertial forces that are directed substantially in a particular degree of freedom, i.e. along a particular axis. The preferred direction for the output forces is along the z-axis 36, substantially perpendicular to the support surface on which the wrist rest 20 is located. The forces can be directed in other directions in other embodiments. The inertial forces can be created, for example, using a high bandwidth dc motor which is coupled to a flexure and provides inertial forces along a z-axis 36. This embodiment is described in greater detail with respect to FIG. 3.

In other embodiments, a linear actuator can be used; preferred actuators include a linear moving voice coil actuator and a linear moving-magnet actuator, which are suitable for high bandwidth actuation. A traditional servo motor used in a harmonic drive configuration can also be a suitable high bandwidth actuator. This embodiment allows for high fidelity control of force sensations in both the frequency and magnitude domains. This also allows the forces to be directed along a desired axis and allows for crisp tactile sensations that can be independently modulated in magnitude and frequency. For example, actuator assembly 34 can be a linear actuator having a stationary portion coupled to the device housing 34, and a moving portion that moves linearly approximately along the Z-axis. The stationary portion may include a magnet and the moving portion can include a wire coil; or these components can be reversed. An inertial mass can be coupled to the linearly-moving portion of the actuator. The actuator oscillates the inertial mass quickly and parallel to the Z axis. Thus, forces produced by the moving mass are transmitted to the housing through the stationary portion of the actuator and felt by the user as tactile sensations. One embodiment of such a linear voice coil actuator is described in copending patent application Ser. No. 09/253,132, which is incorporated herein by reference. In other embodiments, the stationary portion can be the coil and the moving portion can be the magnet.

The actuator in the actuator assembly 34 can be a wide variety of types of actuators. For example, a rotary actuator can be used having rotational force output that is converted to linear force output through a transmission, as is well known to those skilled in the art. A pager motor or other actuator having a rotating shaft, a solenoid having a vertically-moving portion, a linear voice magnet, DC current controlled linear motor, a linear stepper motor controlled with pulse width modulation of an applied voltage, a piezoelectric actuator, a pneumatic/hydraulic actuator, a torquer (motor with limited angular range), a piezo-electric actuator, etc., can be used.

The actuator assembly 34 can be placed in a variety of positions within the housing 34. For example, one preferred embodiment places the actuator on the bottom portion or floor of the housing near the front portion of the wrist rest 20 so that the actuator is positioned near the user contact with the top surface of the wrist rest. In yet other embodiments, the actuator assembly 34 can be connected to a side or top portion of the housing 32 rather than the bottom portion, although it is preferred that the actuator be oriented to output forces approximately along the Z-axis (and thus the top may be preferable to a side).

The magnitude of forces that can be output with respect to an inertial ground are not as high as can be output with respect to an earth ground. The larger the inertial mass, the larger the forces that can be output, so the theoretical limit of force magnitude is very high. Since the wrist rest housing 32 does not need to be moved by the user to operate the device, the inertial mass can be made fairly large to provide higher magnitude forces. Size may be a constraint, however, in most wrist rest embodiments, which include a low profile.

A high bandwidth actuator can alternatively be used to compensate for lower-magnitude forces, i.e., an actuator that can output abrupt changes in force magnitude level. Since the human hand is more sensitive to changes in force level than to absolute force levels, a high bandwidth actuator used to convey low level forces produced with respect to an inertial ground can be quite effective in producing compelling tactile sensations.

An additional challenge of applying a compelling tactile sensation to the housing 32 along the described Z axis is that the wrist rest device 20 sits upon a table or other surface 24 and is therefore physically grounded along that Z axis. In other words, the forces applied by the actuator along the Z axis, with respect to the inertial mass, are countered by the normal forces applied by the table surface upon the housing 32. One way to accommodate these countering forces and to allow greater magnitude forces to be felt by the user is to provide compliance in the z-axis between the surface 24 and a portion of the housing 32 that is contacted by the user. In a preferred embodiment, a flexible or semi-flexible element is provided between the housing 32 and the surface 24. For example, a number of compliant feet 38 can be coupled to the underside of the housing 32 to make contact with surface 24. The feet 38 can be made out of a material such as rubber, foam, or the like. Preferably, the feet have a high compliance in the z-axis to allow the desired magnitude of haptic sensations in the z-axis. Descriptions of tuning compliance to provide greater-magnitude forces are provided in copending application No. 60/157,206, incorporated herein by reference. In other embodiments, a whole layer of compliant material can be positioned underneath or coupled to the underside of the housing 32.

In other embodiments, the desired compliance can be provided in other or additional elements of the wrist rest 20. For example, a cover or top portion of the device can be flexibly or moveably coupled to a base portion of the housing 32, where z-axis motion between these portions magnifies the haptic sensations. For example, the top half of the housing 32 which the user contacts can be coupled to the bottom half by a rubber joint or other flexible layer or coupling. Or, the cover portion contacted by the user can be a smaller portion of the top surface of the housing 32 which is compliant, e.g. a rubber diaphragm. It should be noted that such a compliant cover portion is not driven directly by the actuator, but is provided to more efficiently transmit inertial forces to the user.

Alternate embodiments include coupling the stationary portion of the actuator to a portion of the housing 32 that is different from the base or bottom portion of the housing (e.g. the side of the housing), and providing an amount of flex between the actuator-coupled portion of the housing and the base portion that is in contact with the surface 24. For example, flexible hinges or connecting members can couple the two portions. This can improve the transmissibility of the tactile sensations, leader to greater magnitude forces.

A different implementation that may be used for generating vibrotactile sensations is a motor (or other type of actuator) having a rotating shaft, where an inertial mass is connected to the shaft at an off-center point of the mass. The inertial (eccentric) mass is rotated around the motor shaft with respect to the interface device at various speeds. This can create sinusoidal force signals at various frequencies depending upon the current driven through the motor. One disadvantage with such a methodology is slow response time because the spinning mass must accelerate and decelerate over time to achieve the rotational velocity corresponding to a desired frequency output.

Thus, directed inertial forces can be output along the X and Y axes. One problem in the present invention for outputting forces in the X and Y directions is that the housing 32 is often made stiff in those directions, such that forces will not be easily felt. For example, the rubber feet 38 can be made compliant in the z-direction, but such compliance does not greatly help to magnify forces output in the X- and/or Y-axes. The rubber feet 38 are typically stiff in the x-y plane to prevent the housing 32 from wobbling when the user contacts the wrist rest. However, compliance in the x- and/or y-directions can be provided in alternate embodiments that output forces in the x- or y-directions.

In other embodiments, contact forces rather than inertial forces can be output to the user. Contact forces are more direct forces applied to the user, such as by moving one element of the housing relative to other parts of the housing, where the moving element is coupled to the moving portion of the actuator. The moving element directly contacts the user's hand to produce forces so that the user directly feels the motion of the element, rather than moving an inertial mass and producing forces throughout the housing.

Contact forces can be applied in different ways. For example, a top portion of the housing 32 can be movably coupled to a base portion of the housing 32 and can be coupled to a moving portion of the actuator assembly 34. The top portion can be the upper half of the housing 32, for example, and can be coupled to the base portion by a rotary hinge, flex coupling, mechanical bearing, or other coupling that allows rotational movement of the top portion with respect to the base portion, or linear motion in a similar fashion. The top portion can be coupled to the moving portion of the actuator assembly 34 by a member 40 that is rotatably coupled to the top portion and rotatably coupled to the actuator portion, for example. Alternatively, a flexure or other moveable coupling can be used to allow rotational or linear motion of the cover portion. The cover portion can also be made of a flexible material that can flex to provide its motion and contact forces to the user, such as a rubber diaphragm.

Although the cover portion may actually rotate with respect to the base portion, the range of motion is preferably small enough to approximate linear motion. Preferably, the cover portion has an origin position (rest position) in the middle of its range of motion so that the actuator can move it both up and down. Also, a centering spring bias is preferably provided to move the cover portion to the origin position when no force is applied by the actuator (and by the user). These embodiments are described in greater detail in copending patent application Ser. No. 09/103,281 and No. 60/172,953, incorporated herein by reference.

Of course, both the inertial forces described with reference to FIGS. 2 and 3 as well as the contact forces described above can be included in a single embodiment. For example, the link member and moving element (cover portion or other moving member) can be coupled to the moving inertial mass. Such an embodiment advantageously provides inertial forces that can always be felt by the user, regardless of how the housing is contacted, as well as contact forces which can be compelling in particular situations.

In some embodiments, buttons can also be included on the wrist rest 20 to allow the user to provide "command gestures" to the host computer 14 by pushing one or more buttons. The user can push a button down to provide a command to the computer. The command signal, when received by the host computer, can manipulate the graphical environment in a variety of ways. In some embodiments, one or more of the buttons can be provided with independent force feedback, as described in copending patent application Ser. No. 09/235,132.

A variety of tactile sensations can be output to the user of the keyboard device 12. For example, the inertial mass can be oscillated along the z-axis to create a vibration that is transmitted to the user. The frequency and/or magnitude of the vibration can be commanded. A "pulse" can also be output, in which a single or small number of oscillations are output, causing a single jolt to the user that can correspond with an event or interaction within the computer environment.

These haptic sensations can be correlated with events or interactions displayed or otherwise implemented by the computer, such as the reception of an email message, an appointment notification, a carriage return when typing text, the advancement to a new page in a document, the scrolling of a line of text off a displayed window, the opening of a window or program, the crossing of a text cursor over a tab marker, margin of a page, or other defined location, etc. (herein, a "text cursor" is a separate cursor that is used to indicate where the next text character will be added in a document or on the screen, and is different and distinct from a "mouse cursor" that is a separate cursor controlled by a mouse, trackball, or other device). In games or simulations, the haptic sensations can be correlated with interactions of a controlled entity, such as when a controlled character impacts a wall, falls in water, or is shot by an opponent's gun.

If the keyboard is being used in conjunction with a mouse, trackball, touchpad, or other input device, then keyboard haptic sensations can be output also based on interactions of a mouse-controlled cursor or entity, e.g. the user may leave one hand on the keyboard and thus is able to experience keyboard haptic sensations that are based on mouse motions (and may also experience haptic sensations with the mouse hand if the mouse device has haptic feedback capability). Thus, keyboard sensations can be output based on the mouse cursor moving onto or out of an icon or hyperlink, over nodes in a flow chart, across menu items, or across a window boundary, the cursor moving within a window interior region, a collision of a cursor or other controlled object/entity with a different object, etc. In some embodiments, haptic sensations can be designed to work in conjunction with each other, assuming the user has one hand on a mouse or similar pointing device and the other hand on a keyboard. For example, an impact from an explosion on a controlled character's left side can cause only the keyboard actuator to output a jolt and not the mouse actuator, assuming the user has a left hand on the keyboard and a right hand on the mouse. Or, the keyboard actuator and mouse actuator can alternate outputting force pulses in a sequence to provide a "spatial" haptic effect.

Figure 3:
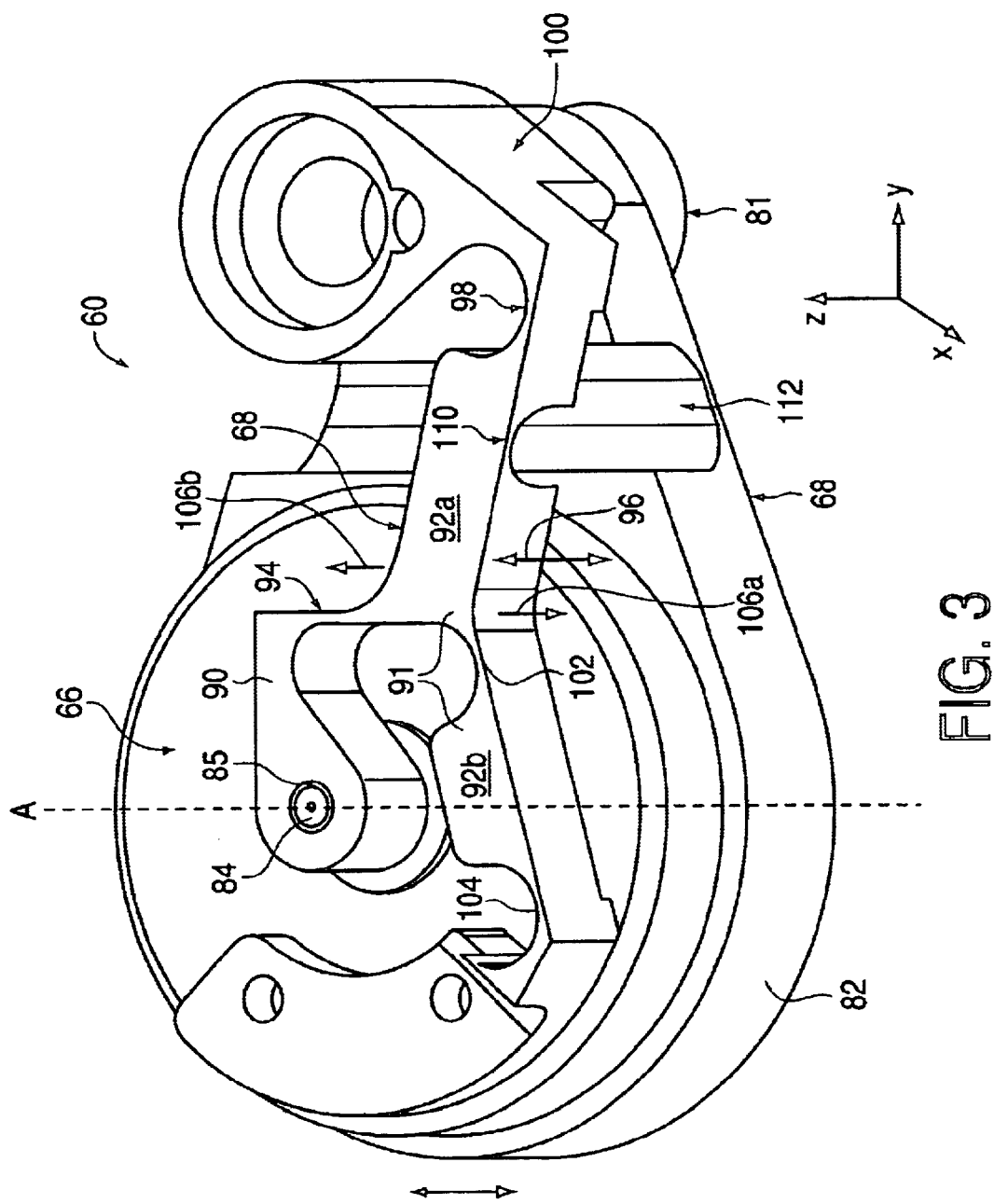
FIG. 3 is a perspective view of one embodiment of an actuator assembly suitable for use with the present invention.

FIG. 3 shows an example 60 of actuator assembly 34 that can be used in the present invention as described above with reference to FIG. 2. In this embodiment, the actuator itself is used as the inertial mass. The actuator assembly includes a flexure for providing inertia forces and which includes an inherent spring bias that brings the inertial mass back to an origin position when no forces are output on the mass.

Actuator assembly 60 includes a grounded flexure 68 and an actuator 66 coupled to the flexure 68. The flexure 68 can be a single, unitary piece made of a material such as polypropylene plastic ("living hinge" material) or other flexible material, or can be made up of two or more pieces that are assembled together. This type of material is durable and allows flexibility of the flex joints (hinges) in the flexure when one of the dimensions of the joint is made small, but is also rigid in the other dimensions, allowing structural integrity as well as flexibility depending on thickness. Some embodiments of flexures used in haptic feedback devices are described in patent application Ser. No. 09/376,649; Nos. 60/172,593; and 60/182,868, all incorporated herein by reference. Flexure 68 can be grounded to the bottom inside surface of housing 32, for example.

Actuator 66 is shown coupled to the flexure 68. The housing of the actuator is coupled to a receptacle portion 82 of the flexure 68 which houses the actuator 66 as shown. Preferably, an amount of space is provided above and below the actuator 66 and receptacle portion 82 to allow motion of the actuator 66 in the z-axis; thus, the receptacle portion 82 should not be coupled to ground since it moves to provide an approximately linear motion, as explained below.

A rotating shaft 84 of the actuator is coupled to the flexure 68 in a bore 85 of the flexure 68 and is rigidly coupled to a central rotating member 90. The rotating shaft 84 of the actuator is rotated about an axis A which also rotates member 90 about axis A. Rotating member 90 is coupled to a first portion 92a of an angled member 91 by a flex joint 94. The flex joint 94 preferably is made very thin in the dimension it is to flex, i.e. one of the x- or y-axis dimensions (the y-axis dimension for the embodiment of FIG. 3), so that the flex joint 94 will bend when the rotating portion 90 moves the first portion 92a approximately linearly. The first portion 92a is coupled to the grounded portion 100 of the flexure by a flex joint 98 and the first portion 92a is coupled to a second portion 92b of the angled member by flex joint 102. The second portion 92b, in turn, is coupled at its other end to the receptacle portion 82 of the flexure by a flex joint 104.

The angled member 91 that includes first portion 92a and second portion 92b moves approximately linearly along the x-axis as shown by arrow 96. When the flexure is in its origin position (rest position), the portions 92a and 92b are preferably angled as shown with respect to their lengthwise axes. This allows the rotating member 90 to push or pull the angled member 91 along either direction as shown by arrow 96. This configuration allows forces output by the actuator to be magnified as they are transmitted to the moveable receptacle portion 82 and to the moving element of the interface device (inertial mass, cover portion, button, etc.). The actual force output depends on the angle of the opposing portions 92a and 92b with respect to each other's lengthwise axes (or with respect to the y-axis).

The actuator 66 is operated in only a fraction of its rotational range when driving the rotating member 90 in two directions, allowing high bandwidth operation and high frequencies of pulses or vibrations to be output. The resulting motion of the angled member 91 compresses or stretches the flexure with respect to the grounded portion 81. To channel this compression or stretching into the desired z-axis motion, a flex joint 112 is provided in the flexure portion between the receptacle portion 82 and the grounded portion 100. Flex joint 112 is oriented to flex along the z-axis (i.e. provide rotation about an x-axis), unlike the flex joints 94, 98, 102, and 104, which flex in the x-y plane (provide rotation about a z-axis). The flex joint 112 allows the receptacle portion 82 (as well as the actuator 66, rotating member 90, and second portion 92b) to move linearly in the z-axis in response to motion of the portions 92a and 92b. In actuality, the receptacle portion 82 and actuator 66 move only approximately linearly, since they have a small arc to their travel; however, this arc is small enough to be ignored for most practical purposes. Thus, when the rotational motion of the rotating member 90 causes the ends of the angled member 91 to move further apart (direction 106a), the receptacle portion flexes down about flex joint 112 along the z-axis. Similarly, if the ends of angled member 91 are made to move closer together (direction 106b), the receptacle 82 and actuator 66 move upwardly along the z-axis, in effect lifting the actuator 66 upward. A flex joint 110 is provided in the first portion 92a of the angled member 91 to allow the flexure about flex joint 112 in the z-direction to more easily occur. The essential elements of the embodiment shown in FIG. 3 can alternatively be implemented with a wide variety of components, including mechanical couplings such as bearings, pin joints, etc.

By quickly changing the rotation direction of the actuator shaft 84, the actuator/receptacle can be made to oscillate along the z-axis and create a vibration on the housing with the actuator 66 acting as an inertial mass. Preferably, enough space is provided above and below the actuator to allow its range of motion without impacting any surfaces or portions of the housing 32, since such impacts can degrade the quality of the pulse, vibrations, and other haptic sensations output to the user. Alternatively, stop mechanisms or travel limiters can be provided to prevent such impacts with the housing.

In addition, the flex joints included in flexure 68, such as flex joint 112, act as spring members to provide a restoring force toward the origin position (rest position) of the actuator 66 and receptacle portion 82. This centering spring bias reduces the work required by the actuator to move itself since the actuator output force need only be deactivated once the actuator reaches a peak or valley position in its travel. The spring bias brings the actuator back to its rest position without requiring actuator force output. This system can be tuned so that amplification of forces output by the actuator is performed at a efficient level, e.g. near the natural frequency of the system. Tuning such a harmonic system using an inertial force actuator and compliant suspension of a moving mass is described in greater detail in copending provisional patent application No. 60/157,206, which is incorporated herein by reference. For example, in the flexure 68, the spring constants can be tuned by adjusting the thickness of the flex joints 94, 102, 98, 104, 110, and/or 112 (in the dimension in which they are thin). In some embodiments, additional springs can be added to provide additional centering forces if desired, e.g. mechanical springs such as leaf springs.

The flexure 68 is advantageous in the present invention because it has an extremely low cost and ease of manufacturability, yet allows high-bandwidth forces to be transmitted as inertial forces. Since the flexure 68 is a unitary member, it can be manufactured from a single mold, eliminating significant assembly time and cost. Furthermore, it is rigid enough to provide strong vibrations with respect to the housing and to provide significant durability. In addition, the flexure provides close to zero backlash and does not wear out substantially over time, providing a long life to the product.

Providing the actuator 66 as the inertial mass that is driven in the z-axis has several advantages. For example, this embodiment saves the cost of providing a separate inertial mass and saves space and total weight in the device, which are important considerations in the home consumer market. Another advantage of the actuator assembly 80 is that it has a very low profile in the z-axis dimension. This is allowed by the orientation of the actuator 66 in the x-y plane, e.g. the axis of rotation A of the actuator shaft 84 is parallel to the z-axis. This makes the actuator assembly 80 very suitable for use in low-profile housings.

In some embodiments, a larger actuator 66 can be used to both output greater magnitude forces and to act as a larger inertial mass, resulting in higher magnitude haptic sensations as experienced by the user. Or, an additional mass can be coupled to the actuator 66 shown in the embodiment of FIG. 3 to provide a larger mass and overall higher-magnitude haptic sensations. When tuning the system for such forces, the resonant frequency of the system should remain the same (e.g. 25 Hz is one tested frequency). Thus, the stiffness of the flexure 68 may have to be modified to maintain the desired resonant frequency when increasing the size of the inertial mass. Members of the flexure can be stiffened by increasing their width and/or by providing a stiffer material.

Of course, in other embodiments, the actuator need not be used as the inertial mass. For example, a flexure can provide a centering spring bias to a separate inertial mass coupled to the flexure, or an inertial mass that is incorporated as part of the flexure. An example of such an embodiment is described in provisional application No. 60/172,953, filed Dec. 21, 1999, and incorporated herein by reference.

In yet other embodiments, multiple actuator assemblies 34 can be provided in different areas in the housing 32. The actuator assemblies can be controlled to output inertial forces at the same time, or at different times based on the keys 104 pressed by the user or other input (from buttons, mouse, etc.) In still other embodiments, the wrist rest can include a sensor that is able to determine when the user is contacting the wrist rest, so that inertial forces are output only when the user is contacting the wrist rest. Furthermore, in some embodiments, the sensor is able to detect the location of the user's contact on the rest 20, either to a coarse or fine resolution. If multiple actuator assemblies are provided in such an embodiment, the actuator assemblies closest the location of user contact can be active to output forces while actuator assemblies further away can be deactivated until user contact is provided within a predetermined close distance thereof.

Figure 4A:
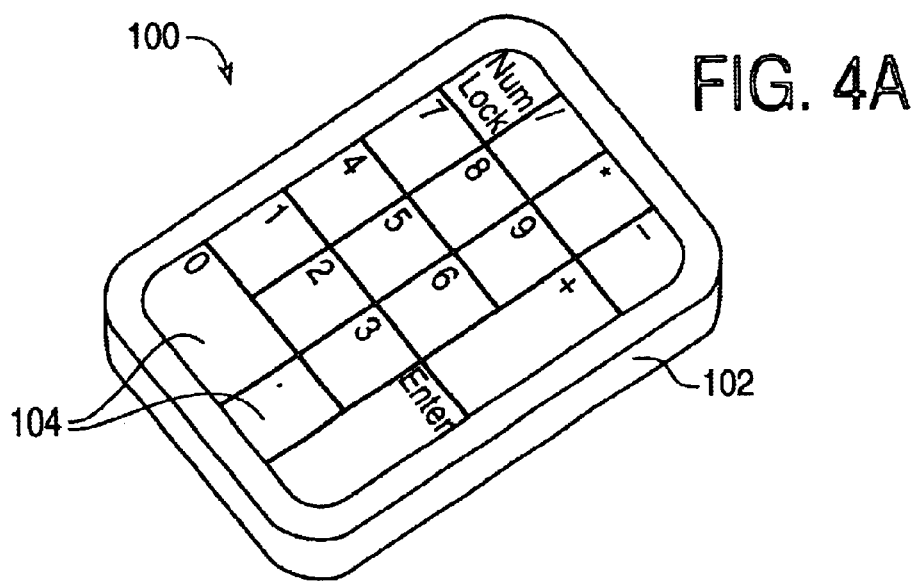
FIG. 4a is perspective view and FIG. 4b is a side cross sectional view of a second embodiment of the keyboard device of the present invention.

FIG. 4a is a perspective view of a second embodiment of a keyboard device 100 suitable for use with the present invention. Device 100 is in the form of a numeric keypad or similar smaller keyboard, which can be operated by a single hand of a user.

Keyboard device 100 includes a housing 102 and a number of keys 104. For example, a common implementation provides number and arithmetic operator keys which can be used to perform operations on numbers presented in an application program running on host computer 14. In other implementations, other types of keys can be provided. For example, the keys 104 can provide input to a game or simulation running on host computer 14 to control a graphical object or entity.

Figure 4B:
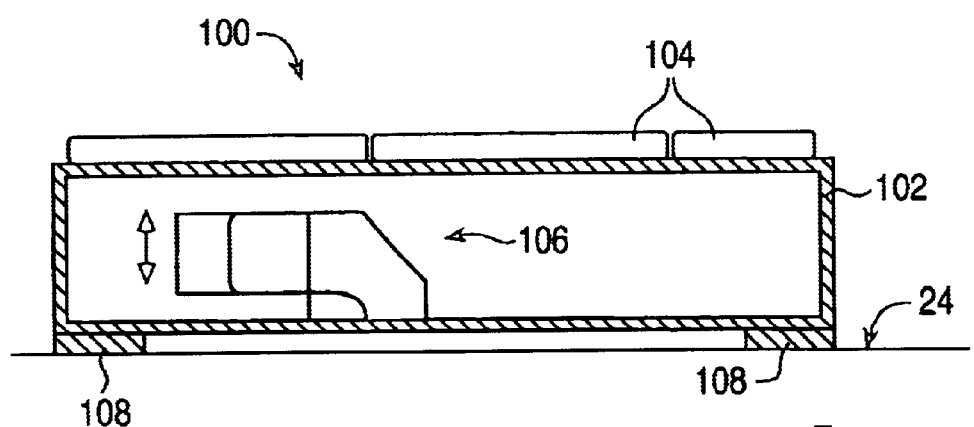
Figure 4B:
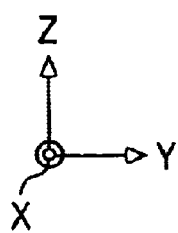

FIG. 4b is a side elevational view of the keyboard device 100 of FIG. 4a. In the described embodiment, an actuator assembly 106 is provided within the housing 102 and coupled to the bottom inside surface of the housing. The actuator assembly 106 can be any of the embodiments described above to provide inertial forces along an axis approximately parallel to the z-axis. The inertial forces are transmitted through the housing 102 and through the keys 104 to the user whose fingers are contacting the keys.

The embodiment 100 preferably includes a compliant element provided between the housing 102 and the support surface 24 to allow amplification (and/or disallow damping) of inertial forces on the housing 102. In FIG. 4b, the compliant element is shown as rubber feet 108 similar to the feet shown for the embodiment of FIG. 2. The compliant element can alternatively be an entire layer positioned between housing and support surface, and/or can be of any compliant material such as foam, etc.

In other embodiments, full-sized keyboards (as shown in FIG. 1) can include the actuator assembly 106 within the keyboard housing 16 similar to the embodiment of FIGS. 4a and 4b. Furthermore, multiple actuator assemblies 106 or 34 can be included within the keyboard housing 102 or 16, similarly as described above with reference to FIG. 2.

Figure 5:
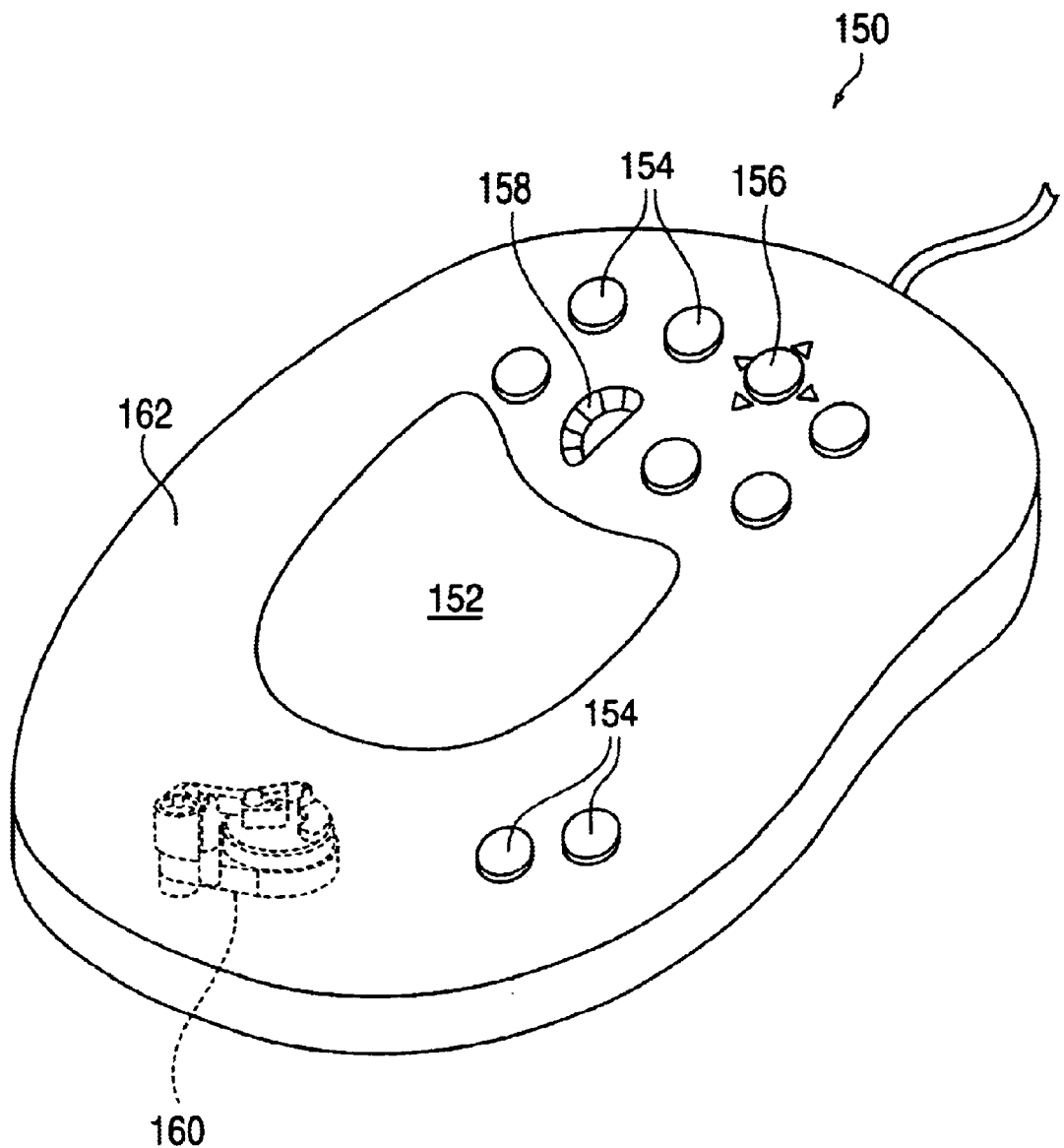
FIG. 5 is a perspective view of a third embodiment of a haptic keyboard device of the present invention.

FIG. 5 is a perspective view of another embodiment 150 of a keyboard device which can include the haptic functionality of the present invention. Device 150 allows a player to provide input to the host computer system with a single hand that rests on the housing of the device 150 and can manipulate various controls. For example, a user's palm can rest on a raised central portion 152 of the device 150 and the fingertips can select the buttons 154, four- or eight-way hat switch 156, and dial 158. In one configuration, the user operates the device 150 with his or her left hand, and operates a different device such as a mouse or trackball with his or her right hand (or the devices can be switched places). Thus, the device 150 can replace a standard keyboard for providing input to such applications as games or the like. One example of a control device providing input functions similar to device 150

Device 150 of the present invention also includes an actuator assembly 160 which is preferably implemented as any of the embodiments described above to provide haptic sensations to the user correlated to displayed events and interactions. For example, the actuator assembly 160 can be coupled to a bottom portion of the housing 162 of the device 150 and move an inertial mass approximately along the z-axis perpendicular to the flat surface on which the device 150 rests. The actuator assembly 160 can be positioned at different locations within the housing, such as directly under the raised portion 152, under the buttons 154 and other controls, etc. Multiple actuator assemblies 150 can be provided and can be used to provide different haptic effects as described above, e.g. particular actuator assemblies can be activated underneath particular active controls, to make one side of the device 150 vibrate, etc. The haptic sensations can be provided in accordance with displayed game events such as collisions, shooting a gun, moving over bumpy terrain, etc.

Figure 6:
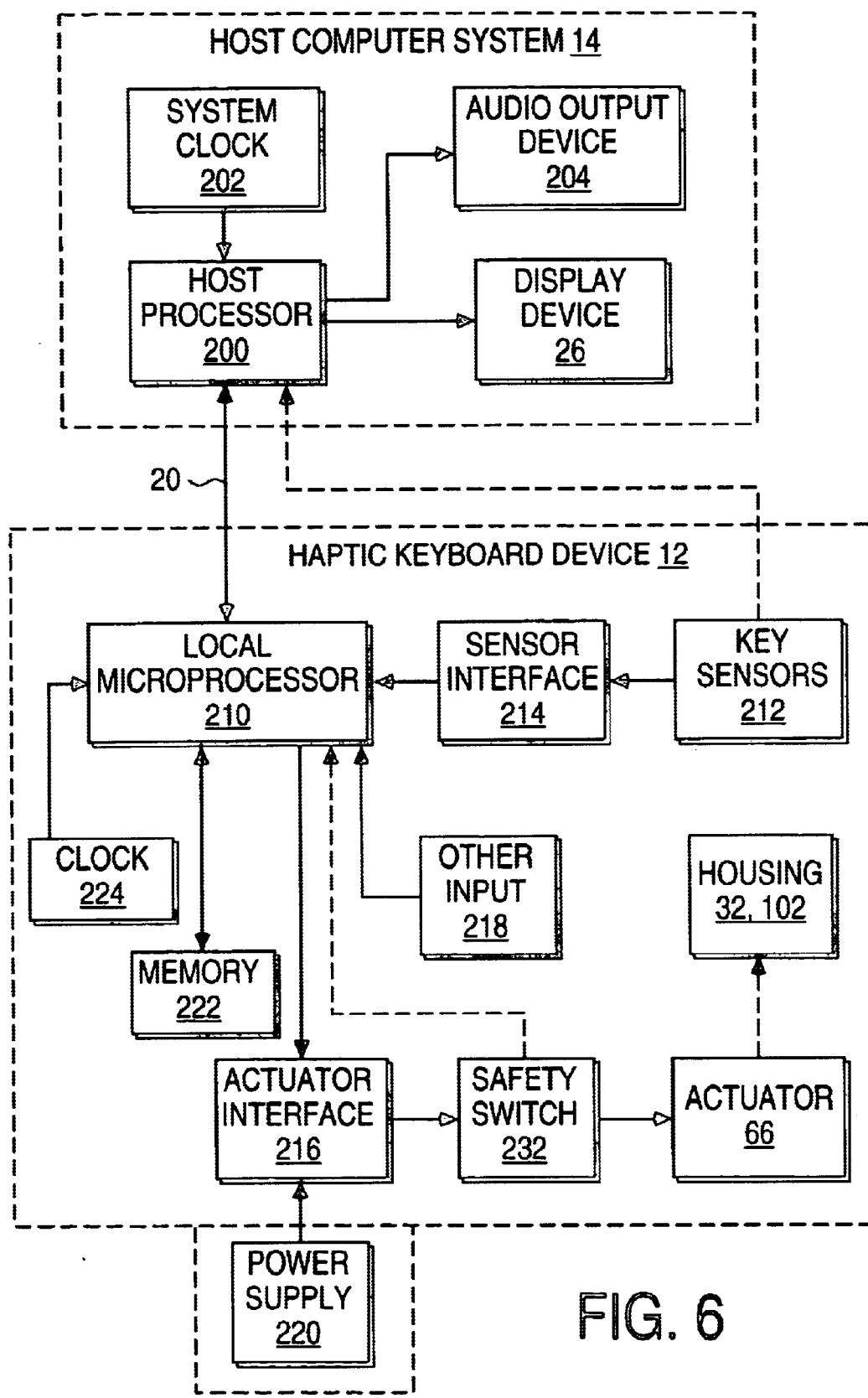
FIG. 6 is a block diagram of the haptic device and host computer of the present invention.

FIG. 6 is a block diagram illustrating one embodiment of the haptic feedback system of the present invention including a local microprocessor and a host computer system.

Host computer system 14 preferably includes a host microprocessor 200, a clock 202, a display screen 26, and an audio output device 204. The host computer also includes other well known components, such as random access memory (RAM), read-only memory (ROM), and input/output (I/O) electronics (not shown). Display screen 26 displays images of a game environment, operating system application, simulation, etc. Audio output device 204, such as speakers, is preferably coupled to host microprocessor 200 via amplifiers, filters, and other circuitry well known to those skilled in the art and provides sound output to user when an "audio event" occurs during the implementation of the host application program. Other types of peripherals can also be coupled to host processor 200, such as storage devices (hard disk drive, CD ROM drive, floppy disk drive, etc.), printers, and other input and output devices.

Keyboard device 12 is coupled to host computer system 14 by a bidirectional bus 20 The bi-directional bus sends signals in either direction between host computer system 14 and the interface device. Bus 20 can be a serial interface bus, such as an RS232 serial interface, RS-422, Universal Serial Bus (USB), MIDI, or other protocols well known to those skilled in the art; or a parallel bus or wireless link. For example, the USB standard provides a relatively high speed interface that can also provide power to actuator 66.

Keyboard device 12 can in some embodiments include a local microprocessor 210. Local microprocessor 210 can optionally be included within the housing of keyboard device 12 to allow efficient communication with other components of the device. Processor 210 is considered local to device 12, where "local" herein refers to processor 210 being a separate microprocessor from any processors in host computer system 14. "Local" also preferably refers to processor 210 being dedicated to haptic feedback of device 12. Microprocessor 210 can be provided with software instructions to wait for commands or requests from computer host 14, decode the command or request, and handle/control input and output signals according to the command or request. In addition, processor 210 can operate independently of host computer 14 by reading key sensor signals and calculating appropriate forces from those sensor signals, time signals, and stored or relayed instructions selected in accordance with a host command. Some examples of microprocessors that can be used as local microprocessor 210 include the MC68HC711E9 by Motorola, the PIC16C74 by Microchip, and the 82930AX by Intel Corp., for example, as well as more sophisticated force feedback processors such as the Immersion Touchsense Processor from Immersion Corp. Microprocessor 210 can include one microprocessor chip, multiple processors and/or co-processor chips, and/or digital signal processor (DSP) capability.

Microprocessor 210 can receive signals from sensor 212 and provide signals to actuator 66 in accordance with instructions provided by host computer 14 over bus 20. For example, in a local control embodiment, host computer 14 provides high level supervisory commands to microprocessor 210 over bus 20, and microprocessor 210 decodes the commands and manages low level force control loops to sensors and the actuator in accordance with the high level commands and independently of the host computer 14. This operation is described in greater detail in U.S. Pat. No. 5,734,373, incorporated herein by reference. In the host control loop, force commands are output from the host computer to microprocessor 210 and instruct the microprocessor to output a force or force sensation having specified characteristics. The local microprocessor 210 reports data to the host computer, such as key press data that describes which keys have been pressed. The data can also describe the states of other buttons and sensors. The host computer uses the data to update executed programs. In the local control loop, actuator signals are provided from the microprocessor 210 to actuator 66 and sensor signals are provided from the sensor 212 and other input devices 218 to the microprocessor 210. Herein, the term "tactile sensation" refers to either a single force or a sequence of forces output by the actuator 66 which provide a sensation to the user. For example, vibrations, a single jolt or pulse, or a texture sensation are all considered tactile sensations. The microprocessor 210 can process inputted sensor signals to determine appropriate output actuator signals by following stored instructions. The microprocessor may use sensor signals in the local determination of forces to be output on the user object, as well as reporting locative data derived from the sensor signals to the host computer.

In yet other embodiments, other hardware can be provided locally to keyboard device 12 to provide functionality similar to microprocessor 210. For example, a hardware state machine incorporating fixed logic can be used to provide signals to the actuator 66 and receive sensor signals from sensors 212, and to output tactile signals according to a predefined sequence, algorithm, or process. Techniques for implementing logic with desired functions in hardware are well known to those skilled in the art. Such hardware can be better suited to less complex force feedback devices, such as the device of the present invention.

In a different, host-controlled embodiment, host computer 14 can provide low-level force commands over bus 20, which are directly transmitted to the actuator 66 via microprocessor 210 or other circuitry. The host computer 14 also directly receives sensor signals from the keys of the keyboard as they are pressed. Host computer 14 thus directly controls and processes all signals to and from the keyboard device 12, e.g. the host computer directly controls the forces output by actuator 66 or 60 and directly receives sensor signals from sensors 212 and other input devices 218. This embodiment may be desirable to reduce the cost of the force feedback device yet further, since no complex local microprocessor 210 or other processing circuitry need be included in the device.

In the simplest host control embodiment, the signal from the host to the device can be a single bit that indicates whether to pulse the actuator at a predefined frequency and magnitude. In a more complex embodiment, the signal from the host could include a magnitude, giving the strength of the desired pulse. In yet a more complex embodiment, the signal can include a direction, giving both a magnitude and a sense for the pulse. In still a more complex embodiment, a local processor can be used to receive a simple command from the host that indicates a desired force value to apply over time. The local microprocessor then outputs the force value for the specified time period based on the one command, thereby reducing the communication load that must pass between host and device. In an even more complex embodiment, a high-level command with tactile sensation parameters can be passed to the local processor on the device which can then apply the full sensation independent of host intervention. Such an embodiment allows for the greatest reduction of communication load. Finally, a combination of numerous methods described above can be used for a single keyboard device 12.

Local memory 222, such as RAM and/or ROM, is preferably coupled to microprocessor 210 in keyboard device 12 to store instructions for microprocessor 210 and store temporary and other data. For example, force profiles can be stored in memory 222, such as a sequence of stored force values that can be output by the microprocessor, or a look-up table of force values to be output based on the current position of the user object. In addition, a local clock 224 can be coupled to the microprocessor 210 to provide timing data, similar to the system clock of host computer 14; the timing data might be required, for example, to compute forces output by actuator 66 (e.g., forces dependent on time dependent factors). In embodiments using the USB communication interface, timing data for microprocessor 210 can be alternatively retrieved from the USB signal.

Key sensors 212 sense the press of any of the keys of the keyboard device and provides signals to microprocessor 210 (or host 14) indicative of the key presses. Sensors suitable for detecting key presses are well known to those skilled in the art.

Actuator 66 (or other type of actuator) transmits forces to the housing 32 of the wrist rest 20 or the housing 16 or 102 of the keyboard device itself as described above with reference to FIGS. 2 and 4a–4b in response to signals received from microprocessor 210 and/or host computer 14. The actuator can be a linear or rotary actuator, linear or rotary DC motor, solenoid, pager motor, moving magnet actuator, piezo-electric actuator, etc. Actuator 66 is provided to generate inertial forces by moving an inertial mass; in the preferred embodiment, the mass is moved linearly and approximately perpendicular to the surface on which the device is supported. The actuator can additionally or alternatively drive a moving element to provide contact forces as described above.

The actuator described herein has the ability to apply short duration force sensation on the housing of the device (and/or on the user's hand). This short duration force sensation is described herein as a "pulse." Ideally the "pulse" is directed substantially along a Z axis orthogonal to the X-Y plane of the support surface 24. In progressively more advanced embodiments, the magnitude of the "pulse" can be controlled; the sense of the "pulse" can be controlled, either positive or negative biased; a "periodic force sensation" can be applied on the housing, where the periodic sensation can have a magnitude and a frequency, e.g. a sine wave; the periodic sensation can be selectable among a sine wave, square wave, saw-toothed-up wave, saw-toothed-down, and triangle wave; an envelope can be applied to the period signal, allowing for variation in magnitude over time; and the resulting force signal can be "impulse wave shaped" as described in U.S. Pat. No. 5,959,613. There are two ways the period sensations can be communicated from the host to the device. The wave forms can be "streamed" as described in U.S. Pat. No. 5,959,613 and pending provisional patent application No. 60/160,401, both incorporated herein by reference. Or the waveforms can be conveyed through high level commands that include parameters such as magnitude, frequency, and duration, as described in U.S. Pat. No. 5,734,373.

Alternate embodiments can employ additional actuators for providing tactile sensations or forces in the planar degrees of freedom of the keyboard device 12 as explained above.

Actuator interface 216 can be optionally connected between actuator 66 and microprocessor 110 to convert signals from microprocessor 210 into signals appropriate to drive actuator 66. Interface 38 can include power amplifiers, switches, digital to analog controllers (DACs), analog to digital controllers (ADCs), and other components, as is well known to those skilled in the art.

Other input devices 218 can be included in keyboard device 12 and send input signals to microprocessor 210 or to host 14 when manipulated by the user. Such input devices can include additional buttons, dials, joysticks, switches, scroll wheels, or other controls or mechanisms. These other input devices 218 can be positioned on the housing 32 or 102 in some embodiments.

Power supply 220 can optionally be included in keyboard device 12 coupled to actuator interface 216 and/or actuator 66 to provide electrical power to the actuator or be provided as a separate component. Alternatively, and more preferably, power can be drawn from a power supply separate from keyboard device 12, or power can be received across a USB or other bus. Also, received power can be stored and regulated by keyboard device 12 and thus used when needed to drive actuator 66 or used in a supplementary fashion. Because of the limited power supply capabilities of USB, a power storage device may be required in the device to ensure that peak forces can be applied (as described in U.S. Pat. No. 5,929,607, incorporated herein by reference). For example, power can be stored over time in a capacitor or battery and then immediately dissipated to provide a jolt sensation to the device. Alternatively, this technology can be employed in a wireless keyboard device 12, in which case battery power is used to drive the tactile actuator.

A deadman switch 232 can optionally be included to allow the deactivation of actuator 66 when the user is not contacting or using the keyboard device. For example, the user must continually activate or close deadman switch 232 during operation of keyboard device 12 to enable the actuator 66. If, at any time, the deadman switch is deactivated (opened), power from power supply 220 is cut to actuator 66 (or the actuator is otherwise disabled) as long as the deadman switch is opened. Embodiments include an optical switch, an electrostatic contact switch, a button or trigger, a hand weight deadman switch, etc.

While this invention has been described in terms of several preferred embodiments, it is contemplated that alterations, permutations and equivalents thereof will become apparent to those skilled in the art upon a reading of the specification and study of the drawings. For example, many different types of tactile sensations can be provided with the actuator of the present invention and many different types of actuators can be used. Furthermore, certain terminology has been used for the purposes of descriptive clarity, and not to limit the present invention. It is therefore intended that the following appended claims include alterations, permutations, and equivalents as fall within the true spirit and scope of the present invention.

What is claimed is:

1. An apparatus, comprising:
    a wrist rest configured to be in communication with a keyboard;
    a compliant member coupled to said wrist rest and configured to be in contact with a surface; and
    an actuator, coupled to said wrist rest;
    said actuator configured to receive a control signal responsive to a key entry on said keyboard and to output a haptic feedback that includes an inertial force substantially perpendicular to the surface.

2. An apparatus as recited in claim 1 wherein the key entry is input by a user.

3. An apparatus as recited in claim 1 wherein the inertial force is output by moving an mass.

4. An apparatus as recited in claim 3 wherein said actuator is coupled to said wrist rest by a flexure and moves as said mass.

5. An apparatus as recited in claim 1 wherein said wrist rest includes a first portion coupled to a second portion, the haptic feedback causing said first portion to move with respect to said second portion.

6. An apparatus as recited in claim 1 wherein said actuator comprises one of a pager motor, a voice coil, a solenoid actuator, a stepper motor, a piezo-electric actuator, a hydraulic actuator, and a pneumatic actuator.

7. An apparatus as recited in claim 1 further comprising a host computer in communication with said keyboard and said actuator, said host computer operable to receive an input responsive to the key entry on said keyboard and to output the control signal to said actuator.

8. An apparatus as recited in claim 7 wherein said host computer further operates to output an auxiliary control signal to said actuator that is related with an input from an auxiliary input device, said actuator outputting an auxiliary haptic feedback to said wrist rest.

9. An apparatus as recited in claim 8 wherein said auxiliary input device comprises one of a mouse, a trackball, a joystick, and a touchpad.

10. An apparatus as recited in claim 1 further comprising a processor, coupled to said wrist rest, said processor operable to generate the control signal based on a command related to the key entry on said keyboard, and output the control signal to said actuator.

11. An apparatus as recited in claim 1 wherein said compliant member comprises one of rubber and foam.

12. An apparatus, comprising:
    a processor;
    a keyboard, in communication with said processor;
    a compliant member coupled to said keyboard and configured to be in contact with a surface; and
    an actuator, coupled to said keyboard;
    said actuator configured to receive a control signal from said processor responsive to a key entry on said keyboard and to output a force to said keyboard that effects haptic feedback.

13. An apparatus as recited in claim 12 wherein said processor is included in a host computer.

14. An apparatus as recited in claim 12 wherein said processor is coupled to said keyboard, operable to receive a command responsive to the key entry on said keyboard and convert the command to the control signal.

15. An apparatus as recited in claim 12 wherein said actuator comprises one of an inertial actuator, a pager motor, a voice coil, a solenoid actuator, a stepper motor, a piezo-electric actuator, a hydraulic actuator, and a pneumatic actuator.

16. An apparatus as recited in claim 12 wherein said compliant member comprises one of rubber and foam.

* * * * *

UNITED STATES PATENT AND TRADEMARK OFFICE
CERTIFICATE OF CORRECTION

PATENT NO. : 6,693,626 B1 Page 1 of 1
DATED : February 17, 2004
INVENTOR(S) : Louis B. Rosenberg It is certified that error appears in the above-identified patent and that said Letters Patent is hereby corrected as shown below:

Column 17,
Line 53, Claim 3 should read as follows:
3. An apparatus as recited in claim 1 wherein the inertial force is output by moving an intertial mass.

Signed and Sealed this

Eighteenth Day of May, 2004

JON W. DUDAS
*Acting Director of the United States Patent and Trademark Office*